US010111392B2

(12) United States Patent
Szeto et al.

(10) Patent No.: US 10,111,392 B2
(45) Date of Patent: Oct. 30, 2018

(54) LIGHTING SYSTEM FOR PROMOTING THE RAPID MATURATION OF COMMERCIAL PLANTS

(71) Applicant: LED Living Technology, Bristol, PA (US)

(72) Inventors: Oliver Szeto, Bristol, PA (US); Gary Sigman, Bristol, PA (US); Kevin High, Bristol, PA (US)

(73) Assignee: LED Living Technology, Bristol, PA (US)

( * ) Notice: Subject to any disclaimer, the term of this patent is extended or adjusted under 35 U.S.C. 154(b) by 324 days.

(21) Appl. No.: 15/049,525

(22) Filed: Feb. 22, 2016

(65) Prior Publication Data

US 2016/0262313 A1 Sep. 15, 2016

Related U.S. Application Data

(60) Provisional application No. 62/130,605, filed on Mar. 9, 2015.

(51) Int. Cl.
*A01G 7/04* (2006.01)
*A01M 29/10* (2011.01)

(52) U.S. Cl.
CPC ............. *A01G 7/045* (2013.01); *A01M 29/10* (2013.01); *Y02P 60/146* (2015.11)

(58) Field of Classification Search
CPC A01G 7/045; A01G 7/04; A01G 9/20; A01M 29/10; Y02P 60/146
See application file for complete search history.

(56) References Cited

U.S. PATENT DOCUMENTS

| 6,554,450 B2 | 4/2003 | Fang et al. |
| 6,921,182 B2 | 7/2005 | Anderson, Jr. et al. |
| 8,579,465 B2 | 11/2013 | Yamada et al. |
| 9,137,874 B2* | 9/2015 | Maxik .................. H05B 37/02 |
| 9,408,275 B2* | 8/2016 | Maxik .................. A01G 7/045 |

(Continued)

FOREIGN PATENT DOCUMENTS

| WO | WO-2004103060 A1 * | 12/2004 | ............. A01G 7/045 |
| WO | WO-2011115123 A1 * | 9/2011 | ............. A01G 7/045 |
| WO | WO-2017134623 A1 * | 8/2017 | ............. A01G 7/045 |

OTHER PUBLICATIONS

Machine translation of WO 2011115123 to Masahito, dated Sep. 2011.*

*Primary Examiner* — Kathleen I Alker
(74) *Attorney, Agent, or Firm* — LaMorte & Associates P.C.

(57) ABSTRACT

A system and method for providing light to a plant with a life cycle that includes a seedling growth period, a vegetative growth period, and a flowering growth period. Illumination to the plant is provided with an array of LEDs that contains red LEDs, blue LEDs and white LEDs. During the seedling growth period, no red LEDs are illuminated. Blue and white LEDs are lit, wherein the blue light is more intense than the white. During the vegetative growth period, white and blue LEDs are lit, wherein the white light is more intense than the white. During the flowering growth period, red and white LEDs are lit, wherein the red light is more intense than the white light. The change in coloring and intensity has beneficial effects during each growth period and at the same time inhibits insects.

20 Claims, 10 Drawing Sheets

(56) References Cited

U.S. PATENT DOCUMENTS

| | | | |
|---|---|---|---|
| 9,894,844 B2 * | 2/2018 | Takashima | A01G 7/06 |
| 2004/0109302 A1 * | 6/2004 | Yoneda | A01G 7/045 |
| | | | 362/2 |
| 2011/0209404 A1 * | 9/2011 | Scott | A01G 7/00 |
| | | | 47/58.1 LS |
| 2012/0104977 A1 * | 5/2012 | McKenzie | A01G 7/045 |
| | | | 315/312 |
| 2012/0161170 A1 * | 6/2012 | Dubuc | A01G 7/045 |
| | | | 257/89 |
| 2013/0255150 A1 * | 10/2013 | Karpinski | A01G 7/045 |
| | | | 47/58.1 LS |
| 2013/0293156 A1 * | 11/2013 | Wells | H05B 33/0803 |
| | | | 315/312 |
| 2016/0000021 A1 * | 1/2016 | Sugimoto | A01G 9/24 |
| | | | 47/66.6 |
| 2016/0007424 A1 * | 1/2016 | Maxik | H05B 33/0854 |
| | | | 315/153 |
| 2016/0007543 A1 * | 1/2016 | Takashima | A01G 7/045 |
| | | | 47/58.1 LS |
| 2016/0007544 A1 * | 1/2016 | Takashima | A01G 7/02 |
| | | | 47/1.01 R |
| 2017/0034895 A1 * | 2/2017 | Vogel | A01G 22/00 |
| 2017/0245440 A1 * | 8/2017 | Cho | A01G 7/045 |
| 2018/0007838 A1 * | 1/2018 | McCord | A01G 7/045 |

* cited by examiner

LIGHTING SYSTEM FOR PROMOTING THE RAPID MATURATION OF COMMERCIAL PLANTS

RELATED APPLICATIONS

This application claims the benefit of U.S. Provisional Patent Application No. 62/130,605, filed Mar. 9, 2015.

BACKGROUND OF THE INVENTION

1. Field of the Invention

In general, the present invention relates to lighting systems that are used to promote the growth of plants and those that deter insects. More particularly, the preset invention relates to lighting systems that contain LEDs and emit light in specific wavelength ranges during specific parts of a plant's growth cycle to optimize growth and accelerate maturation and at the same time inhibits insects.

2. Prior Art Description

There exist many lighting systems for growing plants indoors. However, many of these lighting systems create broad spectrum lighting, such as white light or simulated sunlight. Although plants grow well in broad spectrum lighting, much of light that is produced is reflected by the growing plant. Any light reflected by the growing plant is wasted light and the energy used to produce that wasted light is wasted energy. Thus, plant growth lights that produce light in frequencies that are reflected by the plants are inherently inefficient.

The cost of providing artificial illumination to growing plants can be made more energy efficient by using LED light in place of incandescent, fluorescent, metal halide, or sodium-vapor lamps. Another advantage of LED lights is that the wavelengths emitted by the lights can be controlled by using a matrix of colored LEDs that emit narrow bandwidths of light. Such prior art LED lighting systems are exemplified by U.S. Pat. No. 8,579,465 to Yamada, entitled Plant Growth System, and U.S. Pat. No. 6,921,182 to Anderson, entitled Efficient LED Lamp For Enhancing Commercial And Home Plant Growth.

Although controlling the wavelengths of light shining on plants can be beneficial to certain parts of a plant's growth cycle, narrow bandwidths of light are rarely beneficial throughout the entire growth cycle. Certain wavelengths of light are beneficial to foliage growth, but inhibit root growth. Some wavelengths of light promote growth of young plants, but inhibit growth of mature plants. As such, in the prior art, controlled wavelength light is often used during part of a crop plant's growth cycle. Such prior art is exemplified by U.S. Pat. No. 6,554,450 to Fang, entitled Artificial Lighting Apparatus For Young Plants Using Light Emitting Diodes As Light Sources.

The applicants have discovered a lighting system where different controlled wavelengths of light are used during the different stages of a plant growth cycle. The light used during each stage is designed to produce optimal growth during each stage of the growth cycle. By controlling the wavelengths of light throughout the growth cycle of a plant, optimal growth can be achieved using a minimal amount of energy. The controlled wavelengths of light also repel many types of harmful insects. The improved lighting system is described and claimed below.

SUMMARY OF THE INVENTION

The present invention is a system and method for providing light to a plant having a life cycle that includes a seedling growth period, a vegetative growth period, and a flowering growth period. Illumination to the plant is provided using arrays of LEDs. Each array of LEDs contains red LEDs, blue LEDs and white LEDs. The LED arrays are mounted in lighting fixtures that are positioned above the plant throughout its life cycle. Lighting fixtures for both indoor use and outdoor use can be produced, depending upon application and need.

The light fixtures emit light in wavelength profiles that repel many species of harmful insects. Prior to planting, a user can operate the light fixtures to repel harmful insects out of the planting area.

During the seedling growth period of the plant, no red LEDs are illuminated. Rather, at least some of blue LEDs and white LEDs are lit. The intensity of blue light created by the blue LEDs is at least twice as intense as the white light produced by the white LEDs. This produces a blue/white lighting environment throughout the seedling growth period.

During the vegetative period, no red LEDs are illuminated. Rather, at least some of the white LEDs and the blue LEDs are again lit. However, the intensity ratio is changed. The intensity of white light created by the white LEDs is now at least twice as intense as the blue light produced by the blue LEDs. This produced a white/blue lighting environment throughout the vegetative growth period.

During the flowering period, no blue LEDs are illuminated. Rather, at least some of the red LEDs and white LEDs are lit. The intensity of red light created by the red LEDs is at least twice as intense as the white light produced by the white LEDs. This produces a red/white lighting environment throughout the flowering growth period.

The change in coloring has beneficial effects during each growth period. The blue/white lighting environment promotes the germination of seeds, seedlings and the growth of roots. The white/blue lighting environment promotes the growth of foliage, roots and stems. The red/white lighting environment promotes flowering. Furthermore, all the lighting environments repel many types of harmful insects. The repellant aspects of the light profile can be selectively increased should an insect infestation occur.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention lighting system and method can be used to grow many types of plants, the embodiments illustrated show the lighting system being used to grow potted plants. The potted plants can be a flower or another ornamental plant. However, the present invention lighting system is particularly well suited for use with harvested commodity plants, such as cannabis. Thus, the exemplary embodiment being described will assume that the potted plant is a commercially grown indoor cannabis plant. This embodiment is selected for the purposes of description and explanation. The illustrated embodiment, however, is merely exemplary and should not be considered a limitation when interpreting the scope of the claims when filed.

Figure 1:
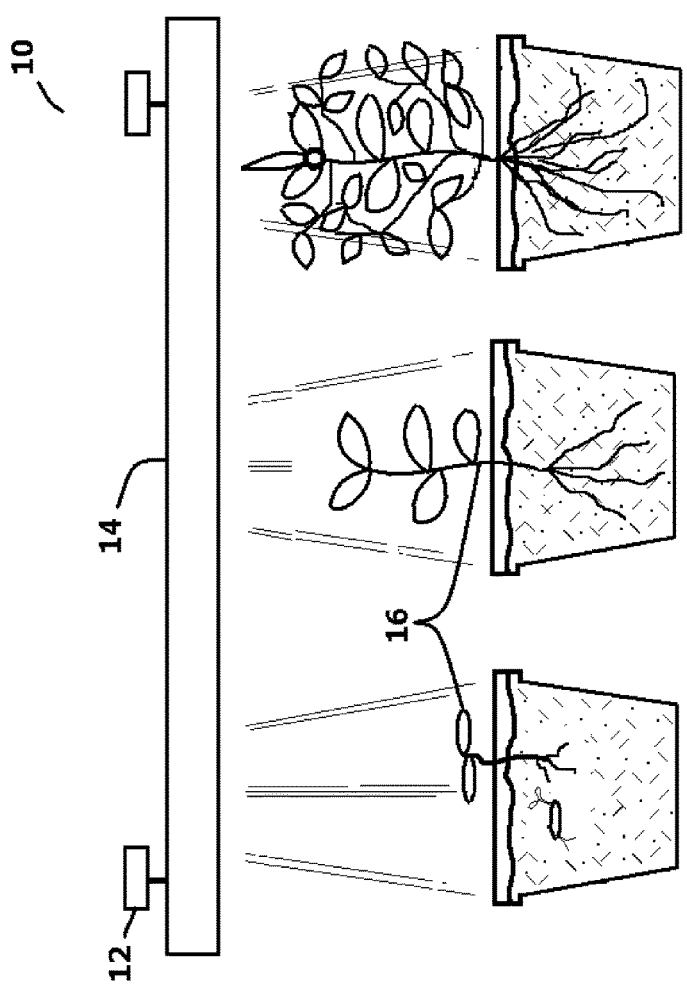
FIG. 1 shows an exemplary embodiment of the present invention illumination system mounted above potted plants.
Figure 2:
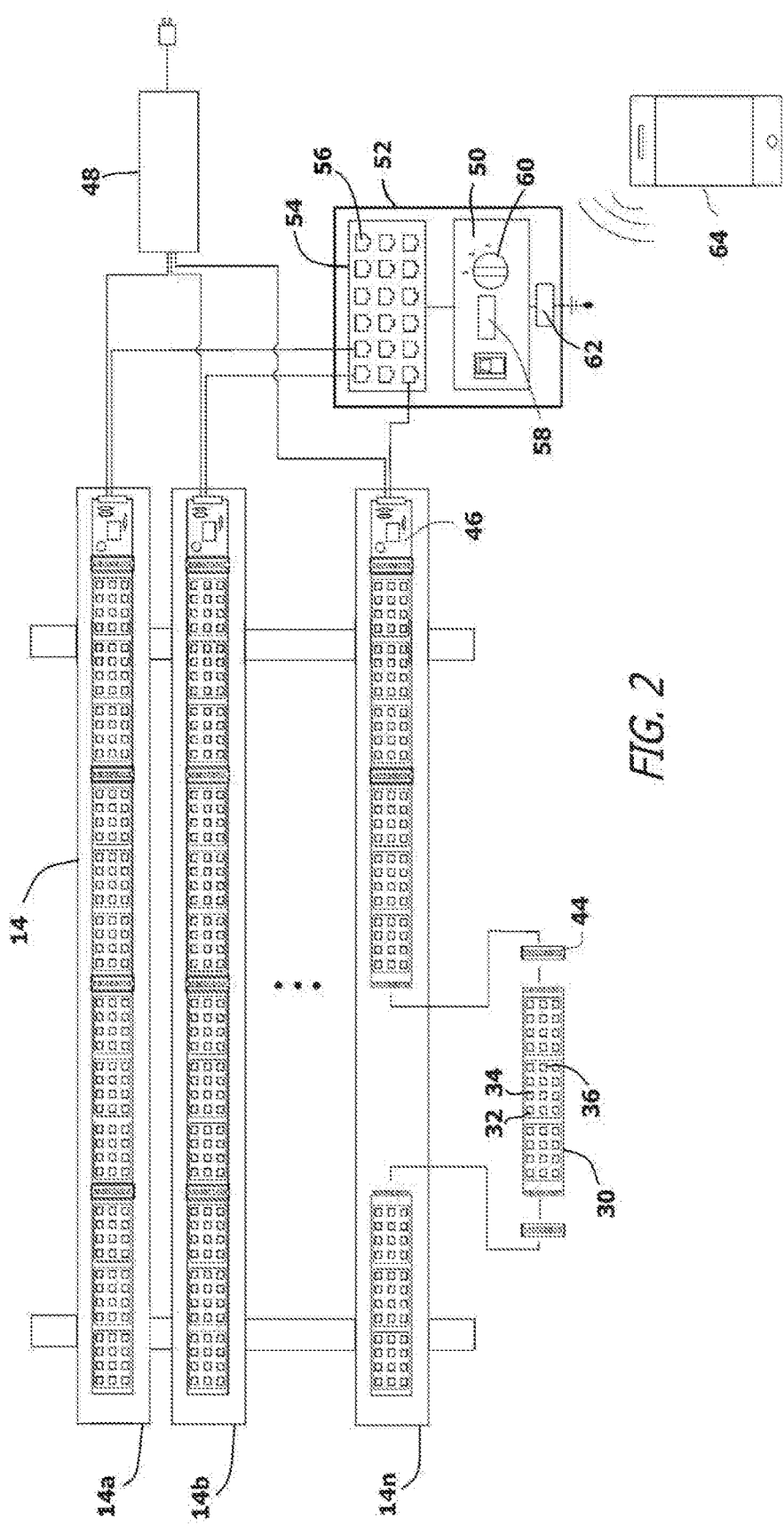
FIG. 2 is schematic of the present invention illumination system.

Referring to FIG. 1, in conjunction with FIG. 2, a lighting assembly 10 is shown. The lighting assembly includes a support framework 12 upon which a plurality of lighting fixtures 14 are mounted. The support framework 12 can be bolted to a ceiling or suspended from a ceiling using wires, chains, or similar suspension elements. The lighting fixtures 14 engage the support framework 12 and are free to be adjusted to any location within the area defined by the support framework 12.

The lighting fixtures 14 are adjusted to be positioned above lines of growing plants 16. As will later be explained, the plants 16 have different growth periods during their life cycles. The height of the support framework 12 and/or the lighting fixtures 14 can be adjusted as the plants 16 grow in height.

Figure 3:
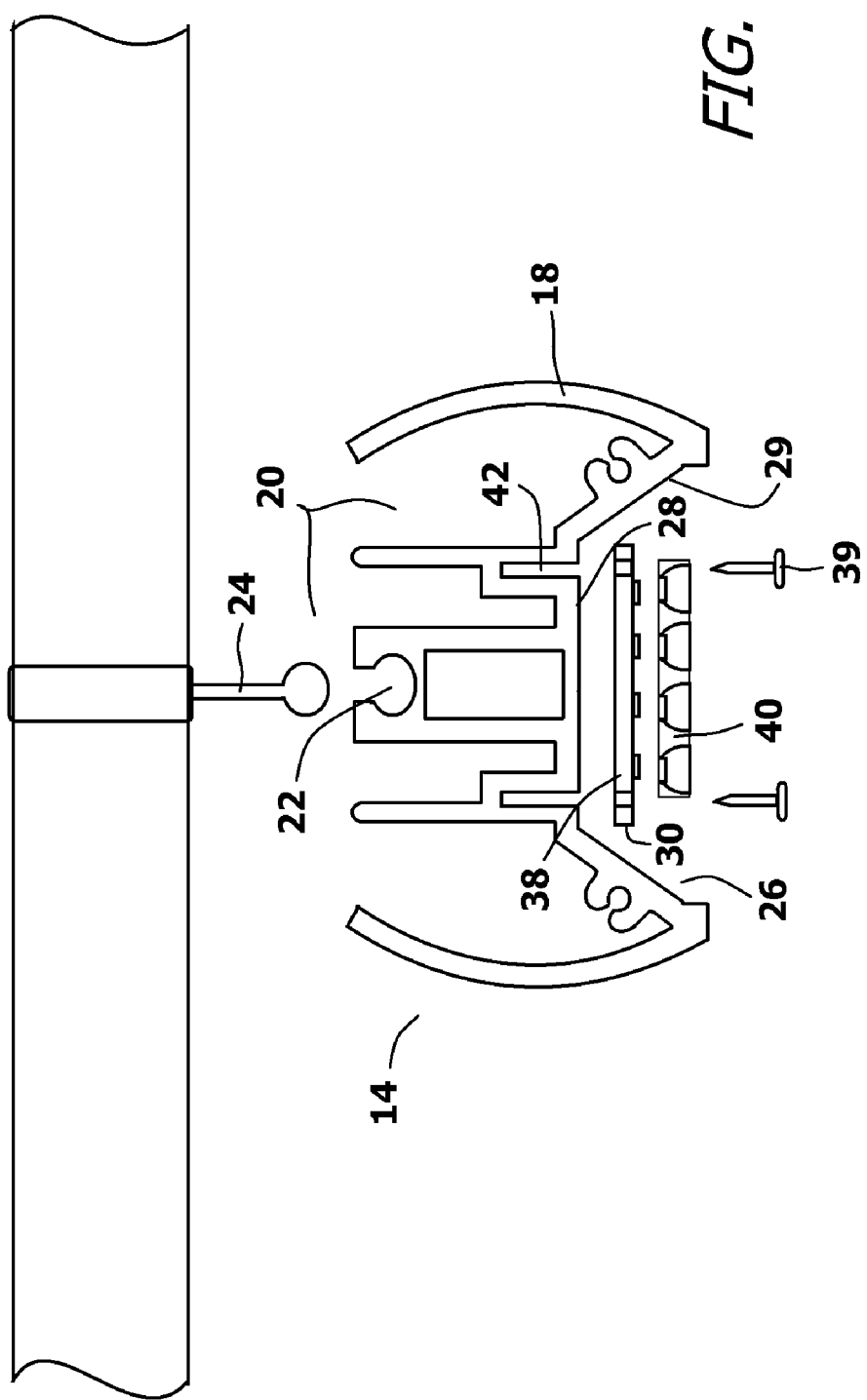
FIG. 3 shows an exploded cross-section of the exemplary lighting fixture.

Referring to FIG. 2 in conjunction with FIG. 3, it can be seen that each lighting fixture 14 includes an extruded housing 18. The extruded housing 18 acts as a heat sink and is preferably made of aluminum or a material that is similarly conductive to heat. The extruded housing 18 has a mounting section 20. In the mounting section 20 is a track 22 that runs along the length of the extruded housing 18. The track 22 receives the head of a hanger 24. The hanger 24 is attached to the support framework 12.

A troffer channel 26 is formed along the length of the extruded housing 18. The troffer channel 26 has a flat base 28 and angled walls 29. LEDs arrays 30 are mounted to the flat base 28. Each LED array 30 contains red LEDs 32, blue LEDs 34 and white LEDs 36. Blue LEDS 34 are considered LEDS that emit light in a range between 410 nm and 490 nm, with a preferred peak frequency about 465 nm±20 nm. Red LEDs 32 are considered LEDs that emit light in a range between 610 nm and 680 nm, with a peak frequency about 640 nm±20 nm. The white LEDs 36 are commercial white LEDs that produce the broadband light inherent in such devices. The white LEDs 36 are preferably between 1500K and 5000K.

Each LED array 30 includes a circuit board substrate 38 upon which the various LEDs 32, 34, 36 are mounted. Each circuit board substrate 38 is mounted directly to the flat base 28 of an extruded housing 18 using mechanical fasteners 39, such as screws. The mechanical fasteners 39 engage mounting slots 42 that are formed into the extruded housing 18. A petunia lens matrix 40 is placed over each LED array 30 to focus the light emitted by the LEDs 32, 34, 36. The petunia lens matrix 40 and the angled walls 29 act together to direct the light down and away from the lighting fixture 14.

Multiple LED arrays 30 are mounted to the extruded housing 18 of each light fixture 14. On each LED array 30, the number of blue LEDs 34, red LEDs 32 and white LEDs 36 are generally equal. It will therefore be understood that each of the light fixtures is capable of emitting blue light, red light and white light is controlled combinations and intensities. The circuit board substrates 38 of the LED arrays 30 interconnect end-to-end using androgynous connector clips 44. The last LED array in the line is connected to a driver board 46. The driver board 46 contains the circuitry needed to separately operate the blue LEDS 34, red LEDs 32 and white LEDs 36 on all the LED arrays 30 that are connected in-line on the lighting fixture 14.

The driver board 46 also channels power to the various LED arrays 30. Each of the driver boards 46 on each of the lighting fixtures 14 is connected to a common power supply 48. Each of the driver boards 46 on each of the lighting fixtures 14 is connected by cable to a central controller 50. The central controller 50 can be mounted anywhere and need not be in the same room as the lighting fixtures 14. However, the central controller 50 is preferably set within a hermetically sealed housing 52 so that the central controller 50 can be exposed to a humid growing environment.

The central controller 50 contains a connector bus 54 with receptacles 56 for receiving cables from a large number of lighting fixtures 14. The connector bus 54 combines the inputs and outputs so that all of the lighting fixtures 14 that are connected to the connector bus 54 can be controlled in unison. The central controller 50 is used to alter the lighting profiles of the LED arrays 30 at different times for different plants. The central controller 50 has a user interface 58 with manual controls 60. In this manner, a person overseeing the growth of a crop can, by altering the LED mixtures on the same fixture, change between preparation lighting, seedling growth lighting, vegetative growth lighting, and flowering growth lighting by physically observing the growth stages of the plants. Alternatively, the central controller 50 may contain a programmable processor into which various times and lighting configurations can be preprogrammed. The central controller 50 may also contain a transceiver 62 so it can communicate with a remote computing device 64, such as a smart phone or a WiFi router. In this manner, it can be programmed and operated remotely.

Figure 4:
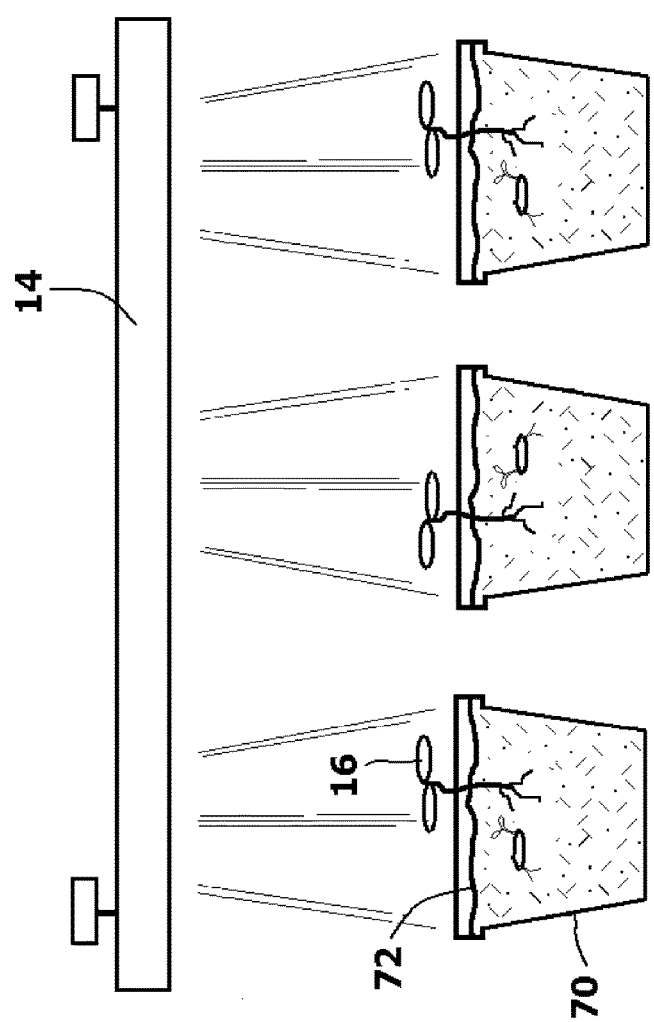
FIG. 4 shows the exemplary lighting fixture of the illumination system with a plant in its first stage of growth.

Referring to FIG. 4 in conjunction with FIG. 2, it will be understood that the lighting fixtures 14 are hung over plant containers 70 in an indoor environment. A plant 16 is planted and grown in soil 72 or a hydroponics solution within the container 70. Prior to the planting of the plants 16, the area in which the plants 16 are to grow can be treated with light. In a preparation stage, the white LEDS and red LEDS can be lit in various combinations and intensities to repel insects from the area. Different insects are repelled best by different wavelengths of light. During the preparation stage, the wavelength profile of the emitted light is adjusted to repel the most prevalent and/or harmful insects currently in the area. After insects have been repelled, the plants 16 can be introduced.

The growth cycle of the plant 16 has three primary stages. The first stage of the growth cycle is the seedling growth stage. The seedling growth stage is represented in FIG. 4. During the seeding growth stage, seeds and/or cloned seedlings are planted into the soil 72 within the container 70. The seedling growth stage continues until the plants establish a significant root system and above-ground foliage while continuing to repel many types of insects.

Figure 5:
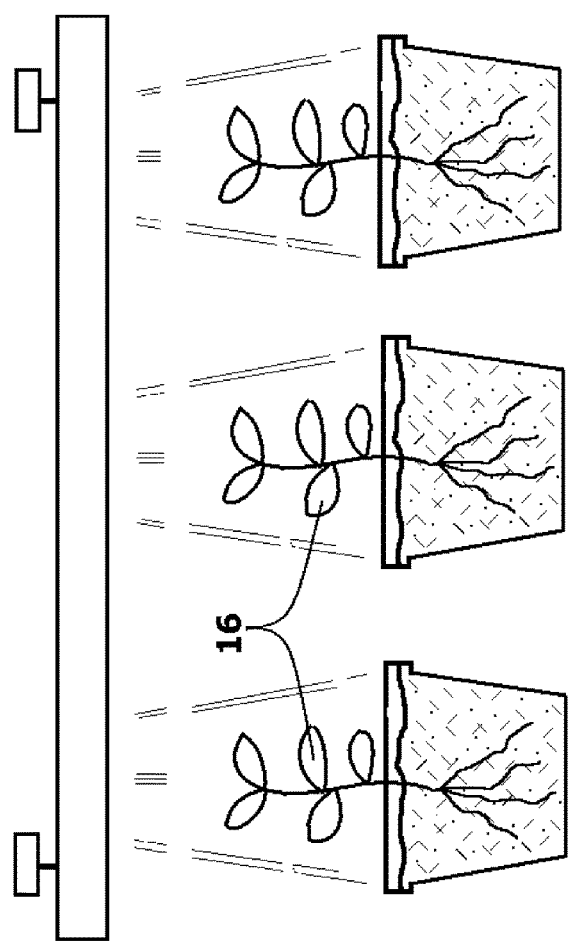
FIG. 5 shows the exemplary lighting fixture of the illumination system with a plant in its second stage of growth.

The second part of the growth cycle is the vegetative growth stage. The vegetative growth stage is represented by FIG. 5. During the vegetative growth stage, the plant 16 is caused to grow and mature as rapidly and as lush as possible while still continuing to repel many types of insects.

Figure 6:
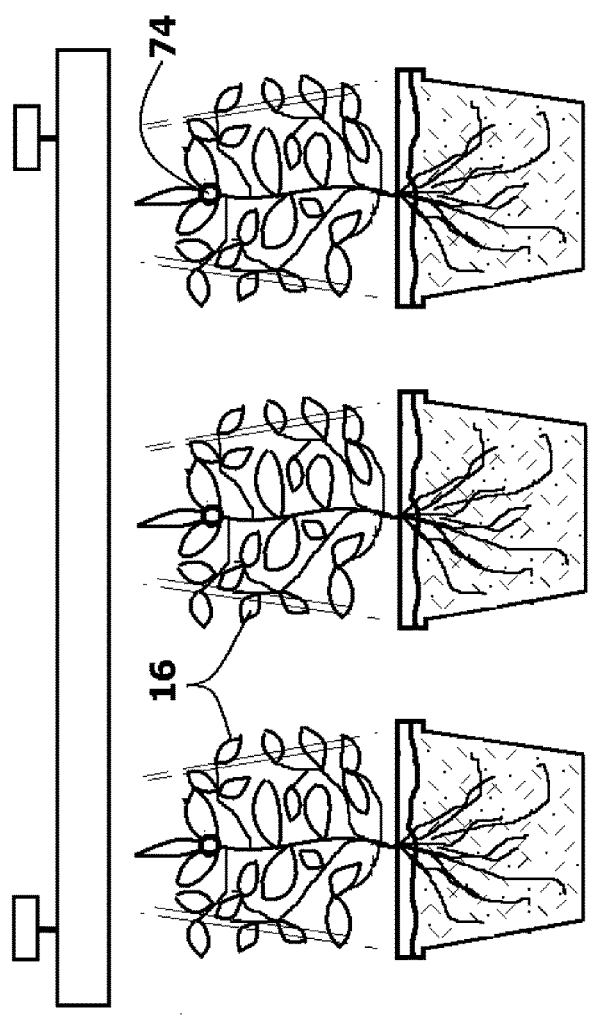
FIG. 6 shows the exemplary lighting fixture of the illumination system with a plant in its third stage of growth.

The third part of the growth cycle is the flowering growth stage. The flowering growth stage is represented by FIG. 6. During the flowering growth stage, the plant 16 is caused to develop flowers 74 while continuing to repel many types of insects. If the flowers 74 are pollinated, the flowers 74 produce seedpods that can be harvested and/or replanted.

Figure 7:
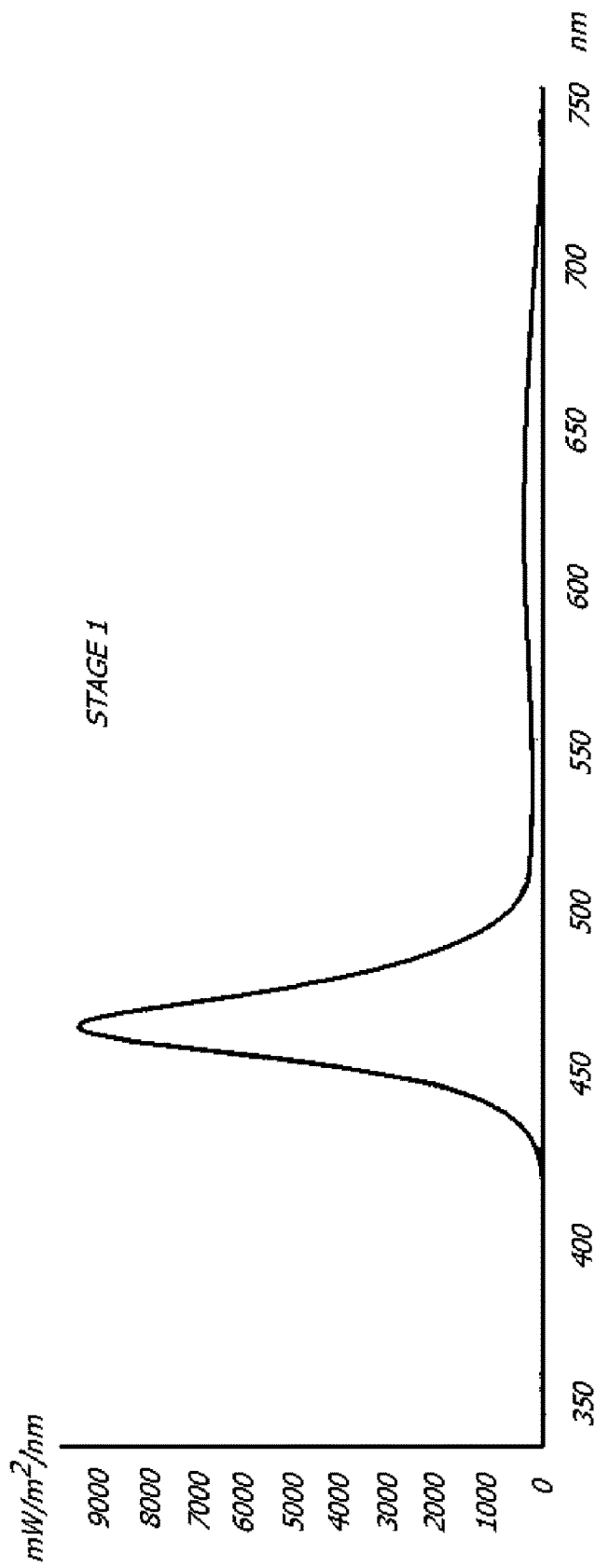
FIG. 7 shows a graph of the light frequencies produced by the array of LEDs during the first stage of growth.

Referring to FIG. 7 in conjunction with both FIG. 4 and FIG. 2, the details of the lighting for the seedling growth stage of growth are detailed. In the seedling growth stage, seeds and or seedlings are set into the soil 72 within the plant container 70. The light fixtures 14 are configured to light the blue LEDs 34 and the white LEDs 36. The number or LEDs lit and the intensities of those LEDS are controlled so that the light produced by the LED arrays 30 are approximately seventy percent blue light and thirty percent white light. The acceptable operational range is from 60%/40% blue/white to 80%/20% blue/white with 70%/30% being preferred. As is indicated in FIG. 7, the maximum intensity of the blue light is between 4000 nM/m²/nm and 5000 nM/m²/nm, as measured from a distance of between 10 cm and 30 cm from the light fixtures 14. Colors, other than blue, created by the white LEDs 18 are all less than 1000 nM/m²/nm, as the same distance.

Since the light produced by the LED arrays 30 are mostly blue light, the long frequency light penetrates deeply into the soil 72. This promotes the germination of seeds and the rapid growth of roots in seedlings. The blue light also orientates the plant so it grows straight. The white light promotes growth of any seedling that breaks the surface of the soil 72 and begins growing foliage. The lighting profile, therefore, promotes the germination of seeds and the rapid growth of roots for seedlings.

Figure 8:
FIG. 8 shows a graph of the light frequencies produced by the array of LEDs during the second stage of growth.

Referring to FIG. 8 in conjunction with both FIG. 2 and FIG. 5, the details of the lighting for the vegetative growth stage are detailed. In the vegetative growth stage, young plants grow from seedlings to mature plants. In the case of cannabis plants, the foliage is the commodity. As such, the growth of the foliage is to be optimized so that the maximum amount of foliage is created in the shortest amount of time, using the smallest amount of energy.

The lighting fixtures 14 are configured to again light the blue LEDs 34 and white LEDs. However, in this second stage, the ratio from the first stage is reversed. The number and intensity of the blue and white LEDs 34, 36 are controlled so that the light produced by each LED array 30 is approximately seventy percent white light and thirty percent blue light. The preferred operational range is from 60%/40% white/blue to 80%/20% white/blue with 70%/30% being preferred.

The white light is mostly absorbed by the foliage. The blue light penetrates the leaves and soil 72 and promotes growth of the roots, stems and branches of the plant 16. The result is the rapid growth of the roots, stems, branches and the supported foliage. Due to the wavelengths of light being emitted by the LED arrays 30, the plants grow to maturity rapidly, using very little reflected light. Field studies show an increase in foliage yield of between 20%-50%, as compared to growth under traditional broad spectrum sodium-vapor growth lights.

Figure 9:
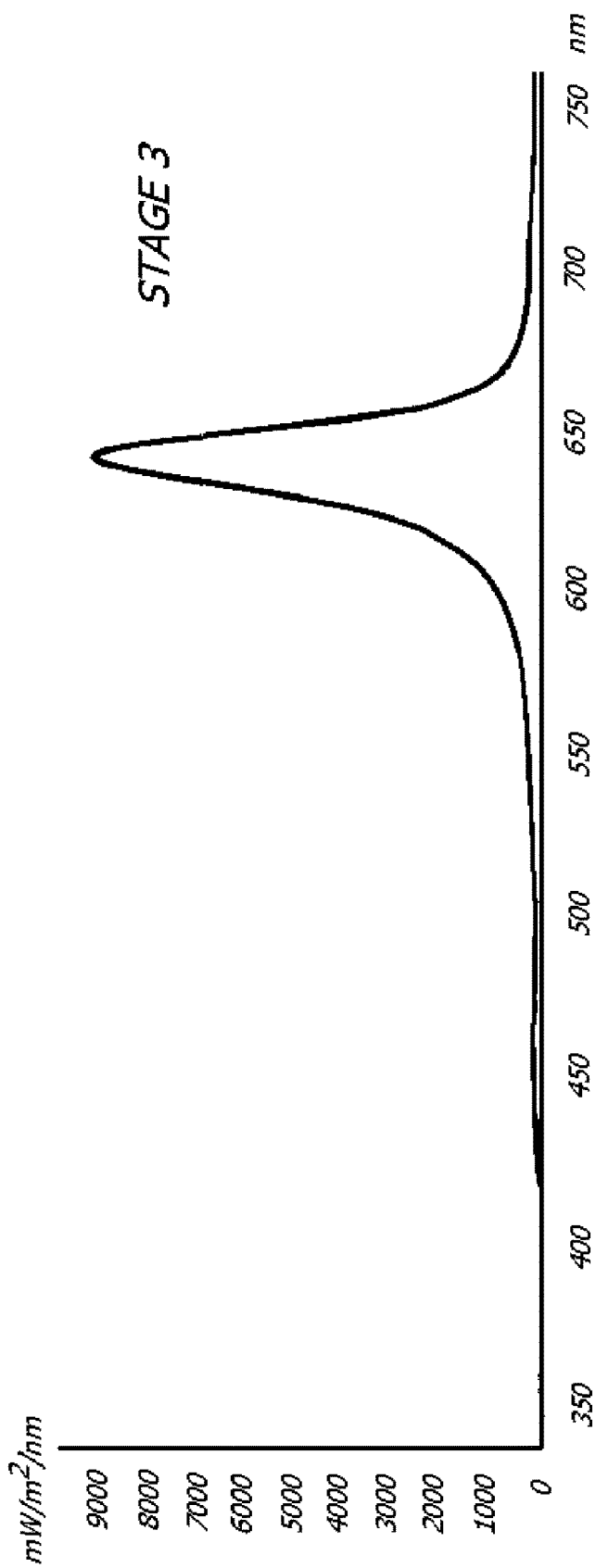
FIG. 9 shows a graph of the light frequencies produced by the array of LEDs during the third stage of growth.

Referring to FIG. 9 in conjunction with FIG. 2 and FIG. 6, the details of the lighting for the flowering stage are detailed. In the flowering stage the plants 22 are mature and have full foliage. The LED array 12 is configured to light the red LEDs 16 and the white LEDs 18. Due to LED color densities in the LED array, the light produced by the LED array 12 is approximately seventy percent red light and thirty percent white light. Some of the white LEDs 18 and/or the red LEDs 16 can be held in reserve. As such, the preferred operational range is from 60%/40% red/white to 80%/20% red/white with 70%/30% being preferred. As is indicated in FIG. 5, the maximum intensity of the blue light is over 9000 nM/m2. Colors, other than red, created by the white LEDs are all less than 500 nM/m2

During the preparation stage and in all three growth stages, the light produced by the LED array 12 contains colored light with a significant component of white light. This lighting profile acts to repeal many insect species that are attracted to flowers 28 and flower buds. Even indoor growing facilities occasionally experience an insect infestation. If the insects are harmful to the plants being grown, the light fixtures 14 can be temporarily configured to maximize the repulsion of certain insects. For instance, if a certain pest is repelled by red light, only the red LEDs 32 can be illuminated. If a certain pest is repelled by white light, only the white LEDs 36 can be illuminated.

Referring back to FIG. 1, it will be understood that as the plant 16 moves through its growth cycle, the light fixture 14 changes from blue/white to white/blue to red/white. The changes in color are created by lighting different LEDs within the LED array 12.

Figure 10:
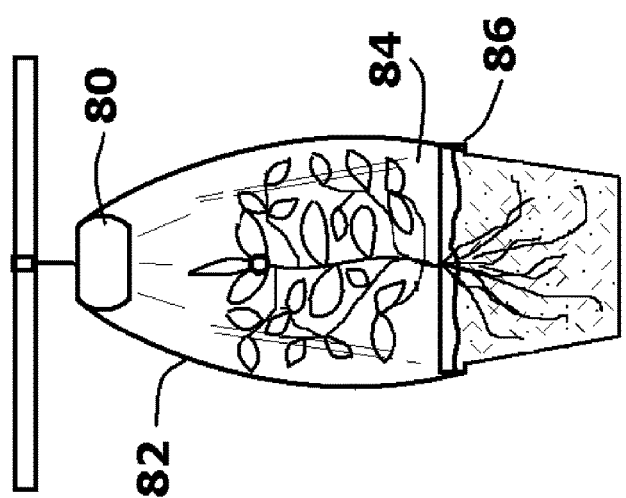
FIG. 10 shows the present invention illumination system with an auxiliary reflective hood.

Referring to FIG. 10, an alternate configuration for the lighting fixture 80 is shown. In this configuration, a reflective shell 82 connects to the light fixture 80 and extends around the plant 16 being grown under the light fixture 80.

The reflective shell 82 defines an interior 84 with an open bottom 86. The plant 16 is placed within that interior 84. The interior 84 is illuminated from above by the light array 16. The interior 84 is illuminated both by direct light and reflected light. It will therefore be understood that the light fixture 80 provides direct light that reflects off the interior of the reflective shell 82 to produce reflected light. This illuminates the plant 16 from above and from the sides. The reflective nature of the reflective shell 82 ensures that most all the light emitted within the interior of the reflective shell 82, eventually is absorbed by the plant 16. Very little of the light is wasted in illuminating the environment outside the reflective shell 82.

The reflective shell 82 can be formed with seams or windows to provide access to the plant 16 for periodic watering, fertilization, and/or observation. Furthermore, gas connectors can be attached to the reflective shell 82 for the purposes of ventilation and to ensure the plants 16 have adequate supplies of carbon dioxide.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A method of providing light to a plant with a life cycle that includes a seedling growth period, a vegetative growth period and a flowering growth period, said method comprising the steps of:
    providing an array of LEDs that contain red LEDs, blue LEDs and white LEDs;
    positioning said array above said plant, wherein said plant is illuminated by said array during said life cycle;
    illuminating no red LEDs, at least some of said blue LEDs, and at least some of said white LEDs to produce a blue/white light with a higher intensity of blue light than white light throughout said seedling growth period;

illuminating no red LEDs, at least some of said white LEDs, and at least some of said blue LEDs to produce a white/blue light with a higher intensity of white light than blue light throughout said vegetative growth period; and illuminating no blue LEDs, at least some of said white LEDs, and at least some of said red LEDs to produce a red/white light with a higher intensity of red light than white light throughout said flowering growth period.

2. The method according to claim 1, further including repelling insects in an area illuminated by said array by producing a light profile with said array that repels said insects.

3. The method according to claim 1, wherein said blue/white light in said seedling growth period has a blue to white light intensity ratio of between 60:40 and 80:20.

4. The method according to claim 1, wherein said blue/white light in said seedling growth period has a blue to white light intensity ratio of 70:30.

5. The method according to claim 1, wherein said white/blue light in said vegetative growth period has a white to blue light intensity ratio of between 60:40 and 80:20.

6. The method according to claim 1, wherein said white/blue light in said vegetative growth period has a white to blue light intensity ratio of 70:30.

7. The method according to claim 1, wherein said red/white light in said flowering growth period has a red to white light intensity ratio of between 60:40 and 80:20.

8. The method according to claim 1, wherein said red/white light in said seedling growth period has a red to white light intensity ratio of 70:30.

9. The method according to claim 1, wherein said blue LEDs produce light that is between 400 nm and 490 nm.

10. The method according to claim 9, wherein said blue LEDs produce light with a peak frequency within 20 nm of 465 nm.

11. The method according to claim 1, wherein said red LEDs produce light that is between 610 nm and 680 nm.

12. The method according to claim 11, wherein said red LEDs produce light with a peak frequency within 20 nm of 640 nm.

13. A method of providing light to a plant with a life cycle that includes a first growth period, a second growth period and a third growth period, said method comprising the steps of:

providing an LED array that includes red LEDs, blue LEDs and white LEDs; and illuminating said plant with said LED array during said life cycle, wherein only said white LEDs and said blue LEDs are illuminated to produce a blue/white light during both said first growth period and said second growth period, wherein said blue/white light has a higher intensity of blue light than white light throughout said first growth period and a higher intensity of white light than blue light throughout said second growth period, and wherein only said red LEDs and said white LEDs are illuminated during said third growth period to produce a red/white light.

14. The method according to claim 13, wherein said higher intensity of said blue light in said blue/white light is between 60% and 80%.

15. The method according to claim 13, wherein during said second growth period said white LEDs and said blue LEDs produce a white/blue mixture of white light and blue light, wherein said higher intensity of said white light in said blue/white light is between 60% and 80%.

16. The method according to claim 13, wherein during said third growth period said red LEDs and said white LEDs produce said red/white light that contains red light and white light, wherein said red light has a greater intensity than does said white light.

17. The method according to claim 16, wherein said red/white light has a red light intensity of between 60% and 80%.

18. The method according to claim 13, wherein said blue LEDs produce light with a peak frequency within 20 nm of 465 nm.

19. The method according to claim 13, wherein said red LEDs produce light with a peak frequency within 20 nm of 640 nm.

20. The method according to claim 13, further including repelling insects in an area illuminated by said LED array by producing a light profile with said array that repels said insects.

* * * * *